Figure 1:
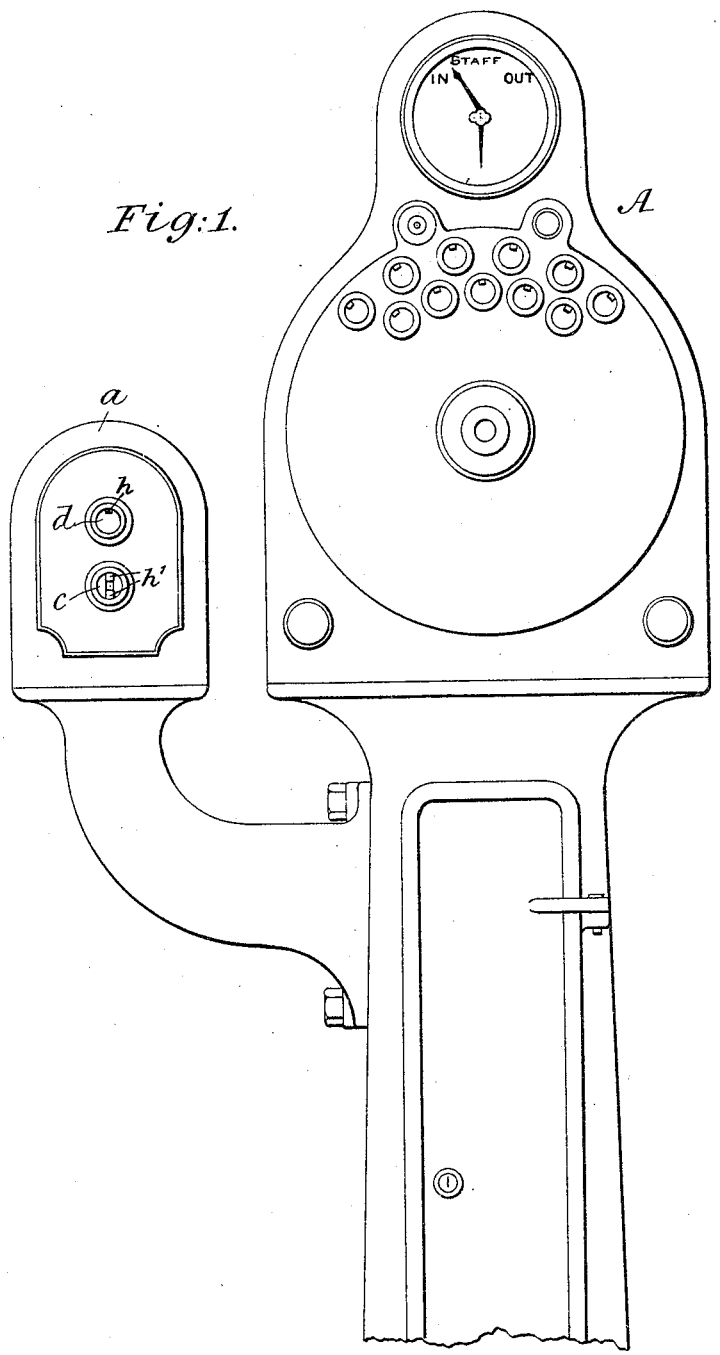

No. 805,026. PATENTED NOV. 21, 1905.
T. H. PATENALL.
STAFF SYSTEM FOR CONTROLLING THE TRAFFIC ALONG SINGLE TRACK RAILROADS.
APPLICATION FILED FEB. 6, 1905.

6 SHEETS—SHEET 2.

WITNESSES:
W. P. Bradley
John A. Rennie

INVENTOR
Thomas H. Patenall
BY
Geo. E. Cruse
his ATTORNEY

No. 805,026. PATENTED NOV. 21, 1905.
T. H. PATENALL.
STAFF SYSTEM FOR CONTROLLING THE TRAFFIC ALONG SINGLE TRACK RAILROADS.
APPLICATION FILED FEB. 6, 1905.
6 SHEETS—SHEET 3.
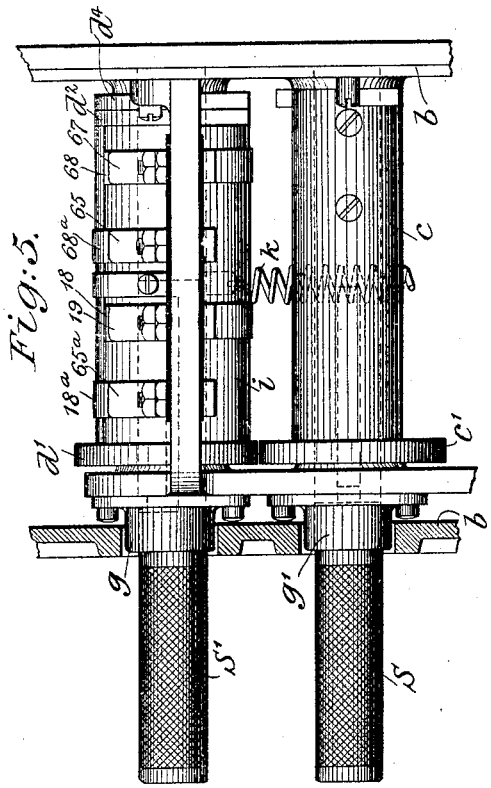
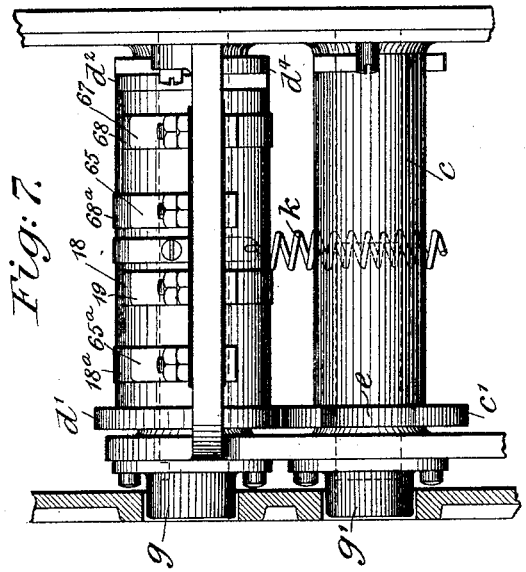
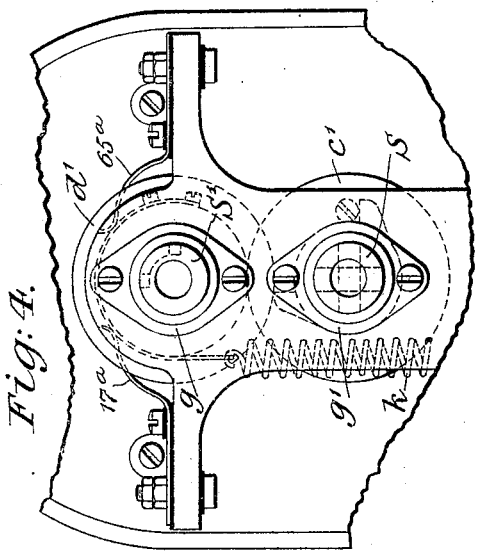
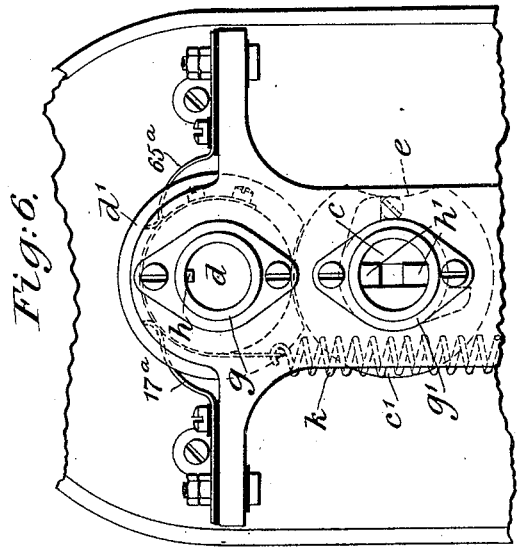
WITNESSES:
W. J. Bradley
John A. Rennie
INVENTOR
Thomas H. Patenall
BY
His ATTORNEY

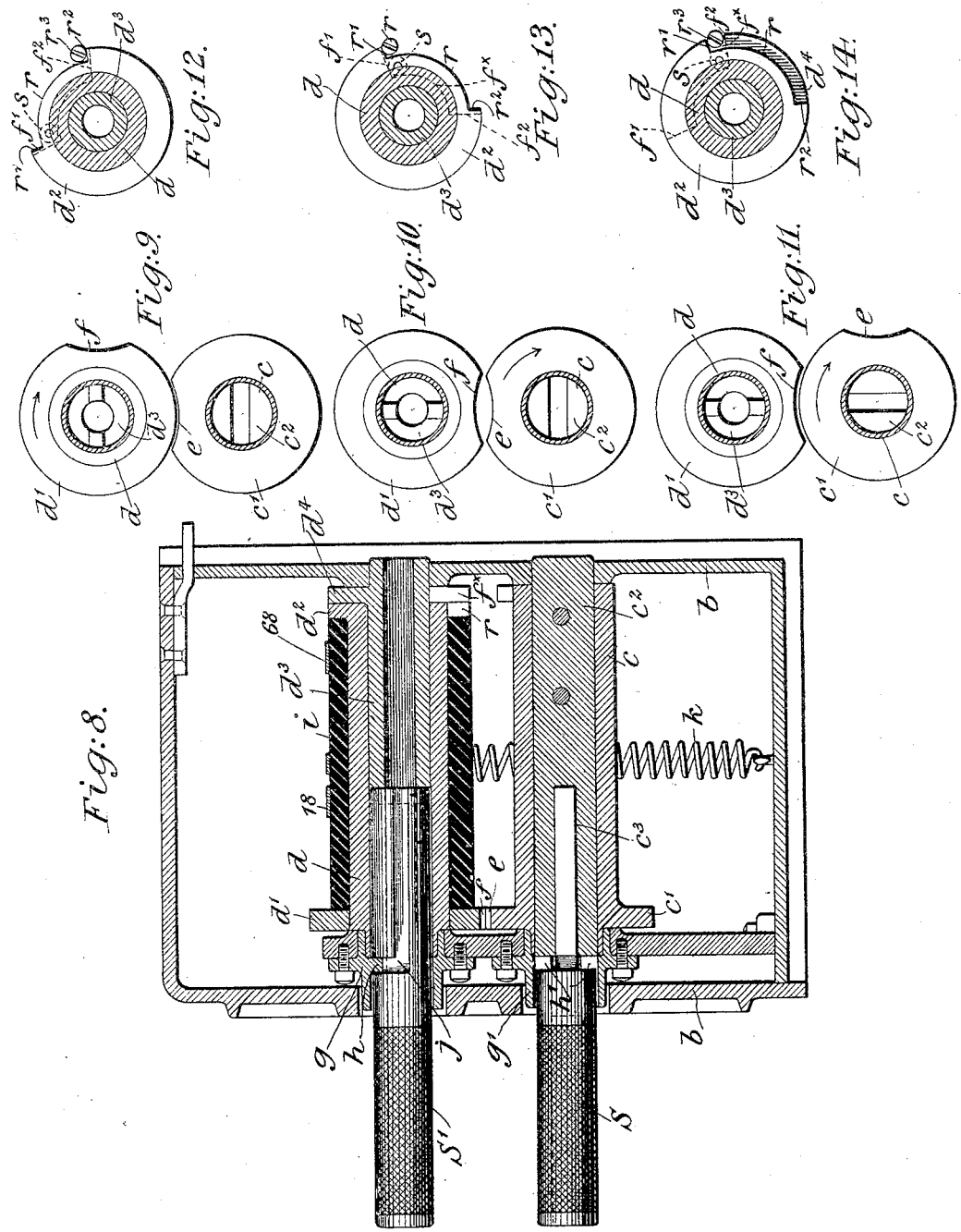

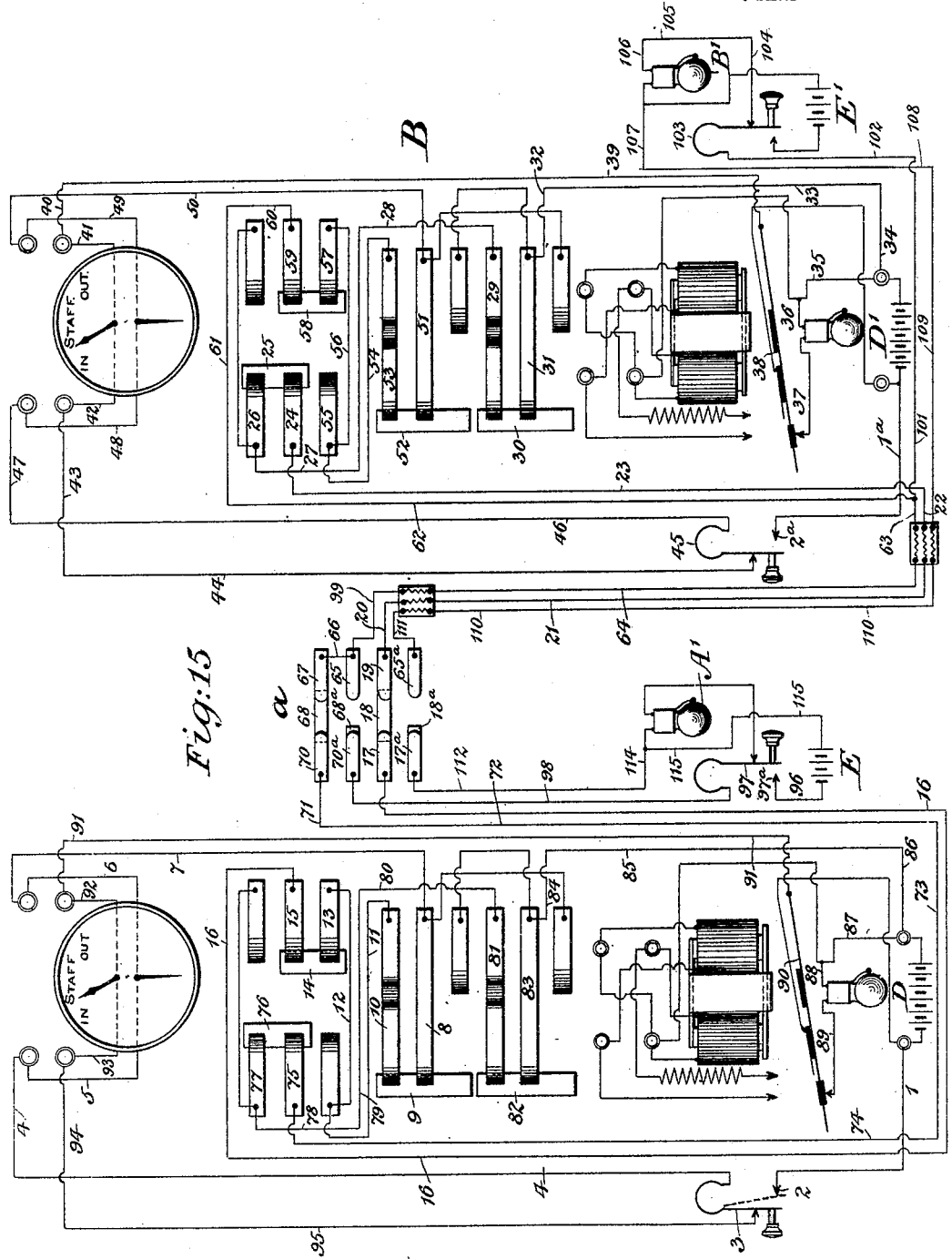

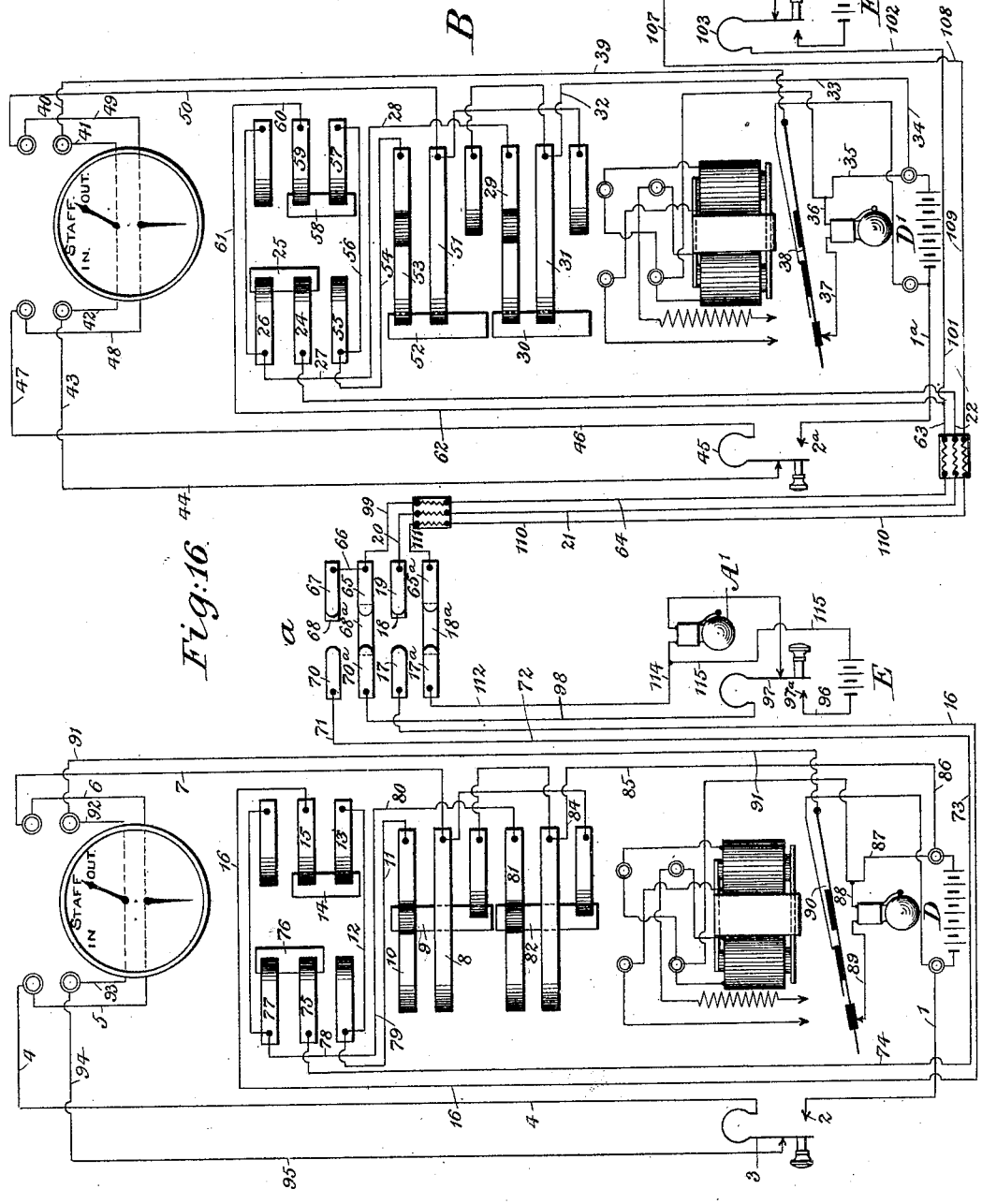

UNITED STATES PATENT OFFICE.

THOMAS H. PATENALL, OF WILKINSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

STAFF SYSTEM FOR CONTROLLING THE TRAFFIC ALONG SINGLE-TRACK RAILROADS.

No. 805,026.   Specification of Letters Patent.   Patented Nov. 21, 1905.

Application filed February 6, 1905. Serial No. 244,392.

*To all whom it may concern:*

Be it known that I, THOMAS H. PATENALL, a citizen of the United States, residing at Wilkinsburg, in the county of Allegheny and State of Pennsylvania, have invented certain new and useful Improvements in Staff Systems for Controlling the Traffic Along Single-Track Railroads, of which the following is a specification.

My invention relates to staff systems for controlling the traffic along single-track railroads, and has more particular reference to a novel construction of device or attachment for use in connection with the staff instrument or instruments comprising the system located at the lowest point or points of grades or inclines along the line of railway, where it is necessary under ordinary conditions to employ pusher-engines to assist the regular trains up such grades or inclines.

Heretofore it has been customary to employ regular staff instruments for this purpose, one of such instruments being located at each end of the section to be controlled, and the staffs employed in connection therewith have, if an equal number of trains passed over the section each day in opposite directions, accumulated in the instrument located at the lowest point of the grade or incline and become relatively lessened in the instrument located at the highest point thereof for the reason that the staffs removed from the former instrument and given to the conductor or attendant in charge of the trains passing thereover as authority to proceed with safety have to be carried back by the pusher-engine attendant as his authority to return. The staffs so carried back would then be reinserted in the instrument at the lower end of the grade, and the number of staffs therein would in consequence remain approximately the same. The trains moving in the opposite direction or downgrade would in turn carry a staff removed from the instrument located at the highest end of the grade, which would be duly deposited in the instrument at the lowest point of the grade, thereby gradually increasing the number of staffs in the instrument at that end of the block and relatively decreasing them in the instrument at the other end. In this method of controlling the traffic, also, it has always been necessary for the pusher-engine to traverse the whole length of the block, (notwithstanding that the grade might only extend over a limited portion thereof,) so that the staff withdrawn from the instrument at the lower end might be placed within the instrument at the other or elevated end of the block that the instruments at each end be thrown into synchronous relation with each other to enable the operator to again withdraw a staff to give to the pusher-engine attendant as his authority to return.

Where the number of trains passing over a section of railroad is large, the loss of time necessarily taken up by the pusher-engine in traveling back and forth from one end of the section to the other would greatly hamper and interfere with the expeditious handling of traffic and the depletion of staffs in one instrument and their accumulation in the other would necessitate frequent exchanges in order that both instruments be kept properly charged with staffs.

Now the principal objects of my present invention are, first, to overcome these and other objections and to produce a simple, inexpensive, and effective instrument or device that may be readily and conveniently attached to and used in connection with many of the ordinary staff instruments now in use. I have designed it, however, more particularly for use in connection with those instruments for which patents have already been granted to me, to which reference may be had, and when used therewith the necessity of the pusher-engine going beyond the highest point of the grade or incline is obviated, and, second, to so construct and arrange the parts that the staffs, if an equal number of trains pass over a section of railroad in both directions, would be exchanged equally and without reducing the number in one of the instruments or increasing the number in the other, or if the number of trains going in one direction is in excess of those going in the opposite direction the necessity of exchanging staffs would occur less frequently.

With these and other objects in view my invention may be said to comprise an instrument or device for use in connection with a staff instrument or instruments, a socket or holder therein adapted to receive and lock a pusher-engine staff, a second socket or holder adapted to receive and lock a regular train-staff from a staff instrument, and means whereby the pusher-staff is unlocked or released.

My invention further comprises an instrument or device for use in connection with a staff instrument, a socket or holder therein adapted to receive a pusher-engine or independent staff, means for locking said staff therein, a second socket or holder adapted to receive a regular train-staff, means for unlocking said pusher-staff, and means whereby the unlocking of said pusher-staff effects the opening of the regular staff-circuits and prevents the closing thereof until a reinsertion and locking of said pusher-staff has been effected and also coincidently closes a call-circuit between the staff instruments.

My invention further comprises certain novel features of construction and arrangement of parts, all of which will be hereinafter fully described, and particularly pointed out in the claims.

Figure 3:
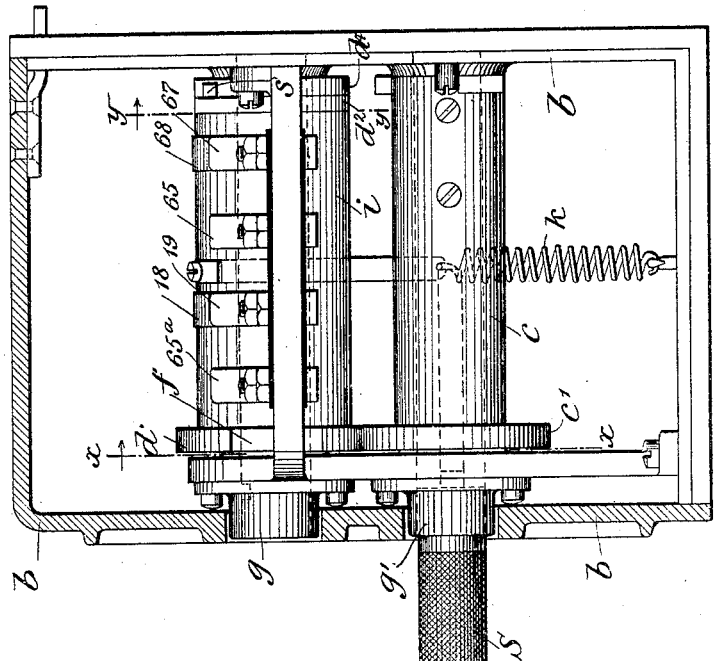
Figure 2:
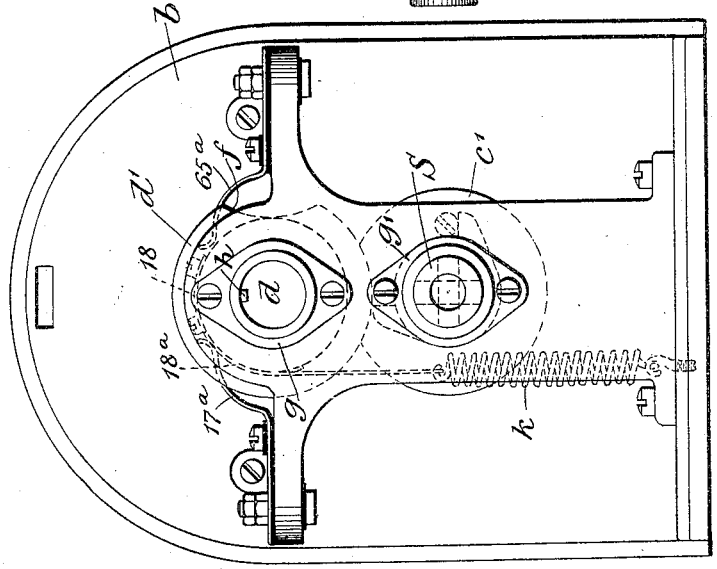

In the accompanying drawings, Figure 1 represents a front elevation of a staff instrument, showing an instrument or device embodying my invention applied thereto. Fig. 2 is a similar view, on an enlarged scale, of the instrument or device alone, the cover being removed therefrom and the pusher-staff locked therein. Fig. 3 is a side elevation thereof looking to the left, the cover being shown in section and the pusher-staff locked in its holder. Figs. 4 and 5 are respectively detail front and side views showing the pusher-staff in its holder and a regular staff from a staff instrument also inserted and operated to release the pusher-staff. Figs. 6 and 7 are similar views with the pusher and regular staff removed and showing the socket or holder for the regular staff locked against movement. Fig. 8 is a central vertical section of an instrument or device embodying my invention, showing both the pusher and regular staffs in place therein, the regular staff being shown in position to release the pusher-staff. Fig. 9 is a detail sectional view taken on the line $x\ x$ of Fig. 3, showing the staff sockets or holders in their initial or normal position—i. e., when the pusher-engine staff is locked in its socket or holder. Figs. 10 and 11 are similar views showing the successive positions the sockets will assume during the operation of releasing the pusher-engine staff and removing it and the regular staff from their respective sockets or holders. Figs. 12 to 14, inclusive, are detail sectional views taken on the line $y\ y$ of Fig. 3 and showing the means for coacting with the regular-staff-receiving socket for operating parts to be described, whereby certain circuits connecting the staff instruments are opened and a "call-circuit" coincidently established. Figs. 15 and 16 are diagrammatical views of the circuits connecting up the staff instruments with an instrument or device embodying my invention, the former figure showing the condition of the circuits when a pusher-staff is in and locked and the latter showing the condition of the circuits after the pusher and ordinary staffs have been removed from my device.

Similar reference characters designate corresponding parts in all the figures of the drawings.

I will now proceed to describe my invention in connection with said drawings, premising, however, that I do not deem it necessary to give any detailed description of the staff instruments themselves, as they may be of any desired or appropriate construction and so related to and electrically connected with each other that the staffs employed will be securely locked therein and cannot be removed therefrom without the consent of the respective operators or attendants at each end of the block, thus preventing unwarranted interference with or withdrawal of such staffs by any one other than those authorized for the purpose.

Referring now more particularly to Figs. 1 to 14, inclusive, A designates a staff instrument which in construction and operation may be similar to that for which Letters Patent have already been granted to me, and $a$ designates a device or attachment embodying my invention and which is secured to the staff instrument in any desired or convenient manner, but preferably as shown in Fig. 1, where it will be within easy reach of the operator.

The instrument or device $a$ comprises a suitable casing $b$, which supports the various working parts, of which $c$ designates a socket or holder for the reception of an independent or pusher-engine staff, and $d$ a socket or holder for the reception of a staff usually employed in connection with an ordinary staff instrument. These sockets or holders are preferably arranged one above the other and are both provided at one of their ends with a disk or flange $c'$ and $d'$, respectively, which revolve in the same vertical plane and are so disposed with relation to each other that their peripheries will rotate in a line circumferentially intersecting each other.

The flanges or disks $c'$ and $d'$ are each provided with a depression $e$ and $f$, respectively, as shown clearly in Figs. 9, 10, and 11 and in dotted lines in Figs. 2, 4, and 6, the one $e$ in the flange or disk $c'$ being concentric with the periphery of the opposing flange or disk $d'$ and within which it moves during rotative movement of the sockets to be described the other depression $f$ being concentric with the flange or disk $c'$ and within which it also moves, so that when the parts are in the position shown in Fig. 9 it will be apparent that the lower staff socket or holder $c$ is securely locked against movement, while the upper staff socket or holder $d$ is free to move in the direction of the arrow. Opposite rotation of the socket or holder $c$ is prevented and likewise limited in both directions by means to be described. When the sockets or holders are in the position shown in Fig. 11, a reversal of conditions to those just described will prevail, as in this instance the upper staff-socket $d$ will be locked against rotative movement, while the lower staff socket or holder $c$ is free to rotate. When, however, the upper staff socket or holder $d$ has been rotated in the direction of the arrow by means of a suitable staff adapted therefor and removed for that purpose from a staff instrument, so as to bring both depressions $e$ and $f$ into register, it will be apparent that either one or the other of the sockets or holders may be rotated. This preliminary and brief description of the staff sockets or holders and of the manner in which one is locked and released by the other, and vice versa, is given for the purpose of facilitating a proper understanding of the operation of my invention, which I will proceed to describe with more especial reference to Figs. 1 to 8, inclusive.

The staff sockets or holders are preferably made and are herein shown tubular or cylindrical in form, being rotatively mounted within the housing or casing $b$, the socket $c$ being fitted with a plug $c^2$, whose inner end is provided with a longitudinal slot $c^3$ for the reception of the body portion of an appropriate staff S, which I have herein termed the "pusher-engine" or "independent" staff, by means of which latter rotative movement is imparted to its socket or holder and the locking or unlocking of such staff within the device or instrument $a$ is effected, as I shall presently describe.

The socket or holder $d$ for the regular staff taken from a staff instrument is preferably made up in sections, some of which are capable of independent rotation, but are under certain conditions interdependent and adapted to rotate together for the purpose not only of rotating the socket or holder to release and permit of the removal of the pusher-engine staff, but of moving certain contacts to be described whereby the main circuits between the staff instruments are opened and a call-circuit coincidently established.

The cylindrical body portion of the socket or holder $d$ has at one end the flange or disk $d'$, previously described, and at its other end it is provided with another flange $d^2$, the periphery of which is cut away or recessed, as represented at $r$, Figs. 12, 13, and 14, to form shoulders $r'$ $r^2$ for engaging a suitable stop $r^3$, provided in the frame for the purpose of limiting the rotative movement of the socket or holder in both directions, and thereby insuring the engagement of certain contacts, whereby the locking or unlocking of the respective staff instruments at each end of the track-section is effected. Any suitable contacts may be used for the purpose, and they are insulated from the socket or holder in any desired or convenient manner; but in practice I prefer to attain the proper and more substantial insulation by surrounding the body portion of the socket or holder with a sleeve of insulating material $i$, which rests between the respective flanges $d'$ and $d^2$ and to which the contact-strips are fastened.

The body portion of the socket or holder $d$ is supported at its inner end by a sleeve $d^3$, which fits loosely within the hollow end thereof and is carried in a suitable bearing formed in the frame or casing of the device or instrument $a$, being provided with a flange or disk $d^4$, similar in every essential respect to the flange or disk $d^2$ on the end of the socket or holder. This flange or disk abuts the disk or flange $d^2$ and is provided with an open recess $f^\times$, whose ends form shoulders $f'$ $f^2$, similar to those provided on the flange or disk $d^2$.

A pin or stud $s$ (dotted lines, Figs. 12, 13, and 14) is secured in the face of the disk or flange $d^2$ and which extends outwardly and lies in the recess $f^\times$, so that when the disk or flange $d^2$ is rotated through the medium of a regular staff previously removed from a staff instrument said pin will be engaged by the shoulder $f'$, thereby causing the rotation of the disk or flange $d^2$, which in turn effects the rotation of the body portion of the socket or holder $d$ and surrounding insulated sleeve $i$, and thus moves and changes the position of the contact-strips to open the circuit by which the staff instruments are controlled.

The inner end of the sleeve $d^3$, which supports the regular-staff-receiving socket, and the end of the body portion of the regular staff are provided, respectively, with a tooth and recess, the former being shown in Figs. 9, 10, and 11, which are adapted to engage each other, so that upon the insertion of a staff within said socket or holder and a rotative movement being given thereto by the operator it will be evident that both will turn together, and so the rotation of the parts are effected, as just described.

The contact-strips are arranged in series, two pairs 18 68 and $18^a$ $68^a$ being secured to the insulated sleeve $i$ and two opposing pairs of contact-springs 17 70 and $17^a$ $70^a$ being supported within the casing on one side of the regular-staff-receiving socket or holder $d$, and two additional pairs 19 67 and 65 $65^a$ are located and similarly supported on the opposite side of said socket or holder $d$. All of these contacts are properly grouped and disposed with relation to each other, so as to control the circuits between the staff instruments at each end of the block or section when the socket or holder $d$ has been turned in one direction or the other, as will be the better understood by reference to Figs. 15 and 16, which show in the former instance the circuits in their normal condition—i. e., when a pusher-engine staff has been inserted and locked within its socket or holder—and in the latter instance when both the regular staff and pusher-engine staff have been removed from their respective sockets or holders.

When the parts are in their normal position, (shown in Figs. 2, 3, and 9,) a pusher-engine staff S is securely locked within its socket or holder $c$, the extremities of the depression $e$ in the flange or disk $c'$, which engage the periphery of the opposing flange or disk $d'$ on the socket or holder $d$, serving to prevent the rotation thereof, and not until such time as a proper and regular staff shall have been inserted within the latter and it has been rotated thereby to bring the depressions $e$ and $f$ into register, as shown in Fig. 10, can the pusher-engine staff be removed.

As the movement of the parts comprising the staff-receiving socket or holder $d$ are independent of each other, yet are at times interdependent, the insertion and removal of a regular staff is permitted without in any way disturbing the position into which the body portion of the socket may have been moved by the insertion therein and rotation of the regular staff, as it will be obvious that after the shoulder $f'$ has engaged the stud $s$ on the flange or disk $d^2$ and moved the latter to the position shown in Figs. 8, 10, and 13, the pusher-engine staff may be readily removed by turning it in the direction of the arrow, and through the locking flanges $c'$ and $d'$ the socket or holder $d$ will be locked against movement, as will be understood. During the operation of removing such pusher-engine staff the contact-strips 18 and 68 are moved away from the contact-strips 17 70 and 19 67, thereby opening the circuits of the main line between the staff instruments and so preventing the removal of a staff from either of the staff instruments until the pusher-engine staff shall have again been inserted and turned in the reverse direction to bring the depressions $e$ and $f$ again into register. Simultaneously with the opening or breaking of the main-line circuit a call-circuit is established by reason of the contacts $18^a$ and $68^a$, which move with those 18 68, bridging the contact-springs $17^a$ $70^a$ and 65 $65^a$, which are in turn electrically connected up with bells A' and B' in the staff instruments. The regular staff which had been used to release the pusher-engine staff may at any time be given a reverse movement to withdraw it from the socket $d$, which will only have the effect of rotating the sleeve $d^3$, bringing it back to its initial position. (Shown in Fig. 14.)

Any suitable means may be provided for preventing the use of staffs to operate the parts other than those specially designed for the purpose, and these means are here shown as escutcheons $g$ and $g'$, arranged, respectively, at the entrance to each of the sockets or holders $c$ and $d$, the one, $g$, being provided with a teat or projection $h$, adapted to enter a groove $j$ in the body portion of the regular staff S', while the other one, $g'$, is preferably provided with two such teats or projections $h'$, between which the flattened body portion of the pusher-staff is inserted.

I prefer to provide for the automatic return of the body portion of the socket $d$ to its initial position. (Shown in Figs. 2, 8, and 9.) Any suitable means may be provided for this purpose; but I have here shown it as comprising a coil-spring $k$, one end of which is secured to the periphery of the insulated sleeve $i$ and its other end to the base of the casing $b$. Thus when the socket or holder $d$ is turned to the right a substantial tension will be exerted upon said spring, which serves to impart opposite rotation to said socket or sleeve when a pusher-engine staff has been used to turn its socket or holder to bring the depression $e$ and $f$ into register.

Having now described the mechanical construction of the instrument or device embodying my invention and the manner in which the same is put into practical operation, I will now describe the circuits controlling the operation of the mechanism with especial reference to Figs. 15 and 16.

Referring to diagram, Fig. 15, let A and B represent two staff instruments which are connected by appropriate wires, A being the instrument located at the lowest point of the track-section. The circuits may be traced by starting from the battery D in the instrument A. It flows from the positive side of the battery through a wire 1 to a front contact 2, and by pressing the spring 3 (dotted lines) against the contact 2 the current will then flow out through the wires 4 and 5 and through the magnets of the lower indicator in the instrument A, thence through wires 6 and 7 and spring 8, which makes contact with strip 9, which is also in contact with spring 10, and thence through wire 11, thence through wire 12, contact-spring 13, contact-strip 14 to contact-spring 15, thence continuing on wire 16 to contact-spring 17 in the instrument or controlling device $a$, through contact-strip 18, contact-spring 19, thence through wire 20 and an appropriate lightning-arrester, thence through wires 21, 22, and 23 to contact-spring 24 in the instrument B, whence it flows through contact-plate 25, contact-spring 26, along wires 27 28 to contact-spring 29, thence through contact-plate 30, contact-spring 31, through wires 32, 33, 34, 35, and 36 to the bell in the instrument B, sounding an alarm therein, and thence through wire 37 to a spring making contact-point, thence through wires 38 39 40 41 to the magnets of the upper indicator in the instrument B. The current then flows along the wires 42 43 44, through the spring 45, wires 46 47 48 to the magnets of the lower indicator in the same instrument, thence through wires 49 50 and through contact-spring 51, contact-plate 52, and contact-spring 53, thence out through wire 54 to contact-spring 55, passing thence through wire 56 to contact-spring 57, contact-plate 58, and contact-spring 59, and thence through wires 60 61 62 63 to and through an appropriate lightning-arrester to contact-spring 65, thence through wire 66 and contact-spring 67, contact-strip 68 and contact-spring 70 in the instrument or controller device $a$ and thence through wires 71 72 73 74 to contact-spring 75, thence through contact-plate 76 and contact-spring 77 out through wires 78, 79, and 80 to contact-spring 81, through said contact-spring and a contact-plate 82 and contact-spring 83, thence through wires 84 85 86 in instrument A, back to battery.

The above are the conditions of the circuits when a pusher-engine staff is locked within its socket or holder and when the operator at the instrument A has signaled the operator at B that it is his desire to remove a staff from his instrument, whereupon the operator at the instrument at B will press the spring 45 so as to engage the contact $2^a$ and maintain pressure thereon, thereby keeping the circuit in the main line between the instruments closed until he gets notification from A that a staff has been withdrawn. During this operation it will be evident that as the operator at A releases his pressure upon the spring 3 the current will flow from the battery $D'$ in the instrument B, through wires $1^a$, front contact $2^a$, thence through spring 45, wires 46 47 to the magnets of the lower indicator and back to the instrument at A in precisely the same manner as the current flowed from the instrument A to the instrument B.

The insertion of the regular staff and subsequent rotation of the socket or holder $d$ will permit of the removal of the pusher-engine staff, as previously described in connection with the mechanical construction of the instrument or controller device $a$, and result in the locking of the regular staff-receiving socket $d$ and the disengagement of the contact-strips 18 68 with the contact-strips 17 70 and 19 67 and the simultaneous engagement of the contact-strips $18^a$ $68^a$ with the contact-strips $17^a$ $70^a$ and 65 $65^a$ will break the main-line circuit and establish a call-circuit between the instruments A and B, as clearly shown in Fig. 16. This call-circuit has embodied within it the bells A' and B', located, respectively, one in each of the staff instruments, and the current from a local battery E (assuming that the operator at the instrument A desires to call the operator at the instrument B and has pressed the spring 97 against the front contact $97^a$) will flow through wire 96, spring 97, wire 98, thence through contact-spring $70^a$, $68^a$, contact-strip $68^a$, contact-spring 65, and through wire 99 to a lightning-arrester, whence it flows along through wires 64, 101, 102, and spring 103, thence through wires 104, 105, and 106 to bell in the instrument B, thence through wires 107 108 109 to a lightning-arrester, whence it flows through wires 110 111, and thence through contact-strips $65^a$, $18^a$, $17^a$, and along through wires 112, 114, and 115 back to battery. Obviously the same conditions will prevail and a similar circuit established when the operator at B sends a call to the operator at A.

Having thus described my invention, what I claim, and desire to secure by Letters Patent, is—

1. A staff system for controlling traffic on railroads, having in combination a staff instrument located at each end of a section of track to be protected, circuits extending between the instruments, a device or attachment for use in connection with said instruments and comprising a socket or holder adapted to receive and lock an independent staff, and a second socket or holder adapted to receive a train-staff removed from either one of said instruments, whereby said independent staff is released and the main circuits between the instrument are opened and the latter locked to prevent the removal of another staff therefrom.

2. A staff system for controlling traffic on railroads, having in combination a staff instrument located at each end of a section of track to be protected, circuits extending between the instruments, a device or attachment for use in connection with said instruments and comprising a rotatively-mounted socket adapted to receive and lock an independent staff, a second socket or holder similarly mounted and adapted to receive a train-staff removed from either one of said staff instruments, whereby said independent staff is released and the main circuits between the instruments are opened, and the latter locked to prevent the removal of another staff therefrom.

3. A staff system for controlling traffic on railroads, having in combination a staff instrument located at each end of a section of track to be protected, a device or attachment for use in connection with said instruments and comprising a socket or holder adapted to receive and lock an independent staff, and a second socket or holder in circuit with the staff instruments and adapted to receive a staff removed from either one of said instruments, whereby said independent staff is released and the main circuit opened to lock the staff instruments and prevent the removal of another staff therefrom.

4. A staff system for controlling traffic on railroads, having in combination a staff instrument located at each end of a section of track to be protected, a device or attachment for use in connection with said instruments and comprising a rotatively-mounted socket or holder adapted to receive and lock an independent staff, a second socket or holder similarly mounted and adapted to receive a staff from either one of said instruments, circuits extending between the latter socket and instruments, and means for releasing said independent staff and coincidently opening the circuits to lock the staff instruments and prevent the removal of another staff therefrom.

5. A staff system for controlling traffic on railroads, having in combination a staff instrument located at each end of a section of track to be protected, a device or attachment for use in connection with said instruments and comprising a rotatively-mounted socket or holder adapted to receive and lock an independent staff, a second socket or holder, rotatively mounted and made up of separate parts, capable of independent rotation and adapted to receive a staff removed from either one of said instruments, circuits extending between said instruments and appropriate contact-pieces in the device or attachment, and movable contact-strips adapted to engage and disengage the contact-pieces upon rotation of said last-mentioned socket, whereby the circuits are opened and closed and the pusher-engine or independent staff simultaneously locked or unlocked.

6. A staff system for controlling traffic on railroads, having in combination a staff instrument located at each end of a section of track to be protected, a device or attachment for use in connection with said instruments and comprising a rotatively-mounted socket or holder adapted to receive an independent staff, a second socket or holder, similarly mounted and adapted to receive a staff removed from either one of said instruments, said last-mentioned socket being made up of an inner and an outer section adapted to rotate together in one direction and to independently rotate in the opposite direction, contact-strips arranged on one of the sections and adapted to move therewith, and contact-pieces in circuit with said instruments, which upon rotation of the socket are engaged and disengaged by said contact-strips, whereby the circuits are opened and closed and the pusher-engine or independent staff simultaneously locked or unlocked.

7. A staff system for controlling traffic on railroads having in combination a staff instrument located at each end of a section of track to be protected, a device or attachment for use in connection with said instruments, circuits extending between said instruments and the device or attachment, said circuits being normally closed to permit of the removal of a staff from either one of said instruments, means for opening said circuits and locking them in such open position, whereby the removal of a staff from either one of said instruments is prevented, and means for automatically closing said circuits after their release by said locking means.

8. An attachment or device, for use in connection with a staff instrument or instruments, a socket or holder therein, adapted to receive and lock a pusher-engine or independent staff, a second socket or holder adapted to receive a regular train-staff from a staff instrument, and means operable by said regular staff whereby the pusher-staff is unlocked or released.

9. An attachment or device, for use in connection with a staff instrument, located one at each end of a track-section to be protected, and comprising a socket or holder adapted to receive a pusher-engine or independent staff, means for locking said staff therein, a second socket or holder adapted to receive a regular train-staff, means for unlocking said pusher-staff, and means whereby the unlocking of said pusher-staff effects the opening and locking of the regular staff-circuits and prevents the closing thereof until a reinsertion and locking of said pusher-staff has been effected.

10. A staff system for controlling traffic on railroads, having in combination a staff instrument located at each end of a section of track to be protected, circuits extending between the instruments, a device or attachment for use in connection with said instruments and comprising a socket or holder adapted to receive and lock an independent staff, and a second socket or holder adapted to receive a train-staff removed from either one of said instruments, whereby said independent staff is released and the main circuits between the instruments are opened and the latter locked to prevent the removal of a staff until the independent staff has been returned to socket and main circuits restored.

11. An attachment or device in circuit with a staff instrument, located at either end of a track-section to be protected, comprising a socket or holder adapted to receive an independent staff, a second socket or holder adapted to receive a regular train-staff removed from either one of said instruments, locking means common to both sockets, whereby the locking of one socket effects the release of the other, and vice versa, and the circuits between the staff are opened or closed.

12. An attachment or device in circuit with a staff instrument located at either end of a track-section to be protected, comprising a rotatively-mounted socket adapted to receive an independent staff, a second socket or holder similarly mounted and adapted to receive a regular staff removed from either one of said staff instruments, said sockets being provided with flanges or disks which rotate in a line circumferentially intersecting each other and having depressions therein, which when brought into register or opposite each other, permit of the rotation of either one of said sockets and simultaneous locking of the other, whereby the pusher-engine or independent staff is locked or unlocked and the circuits between the staff instruments opened or closed.

13. An attachment or device in circuit with a staff instrument located at either end of a track-section to be protected, comprising a rotatively-mounted socket adapted to receive and lock an independent staff, a flange or disk on said holder having a depression therein, a second socket or holder similarly mounted and made up of sections capable of independent rotation in one direction, means common to both sections whereby they are caused to rotate together in the opposite direction, a flange or disk secured to one of said sections, adapted to rotate in a line circumferentially intersecting the flange or disk on the independent staff-nolder and having a similar depression therein, whereby upon insertion and rotation of a regular staff said sections are simultaneously moved and the depressions brought into register or opposite each other to permit of the rotation of the independent staff-holder and the release of its staff and whereby also the regular staff-socket is locked and the circuits between the staff instruments opened.

In testimony whereof I have signed my name to this specification in the presence of two subscribed witnesses.

THOMAS H. PATENALL.

Witnesses:
J. S. HOBSON,
W. L. McDANIEL.